UNITED STATES PATENT OFFICE.

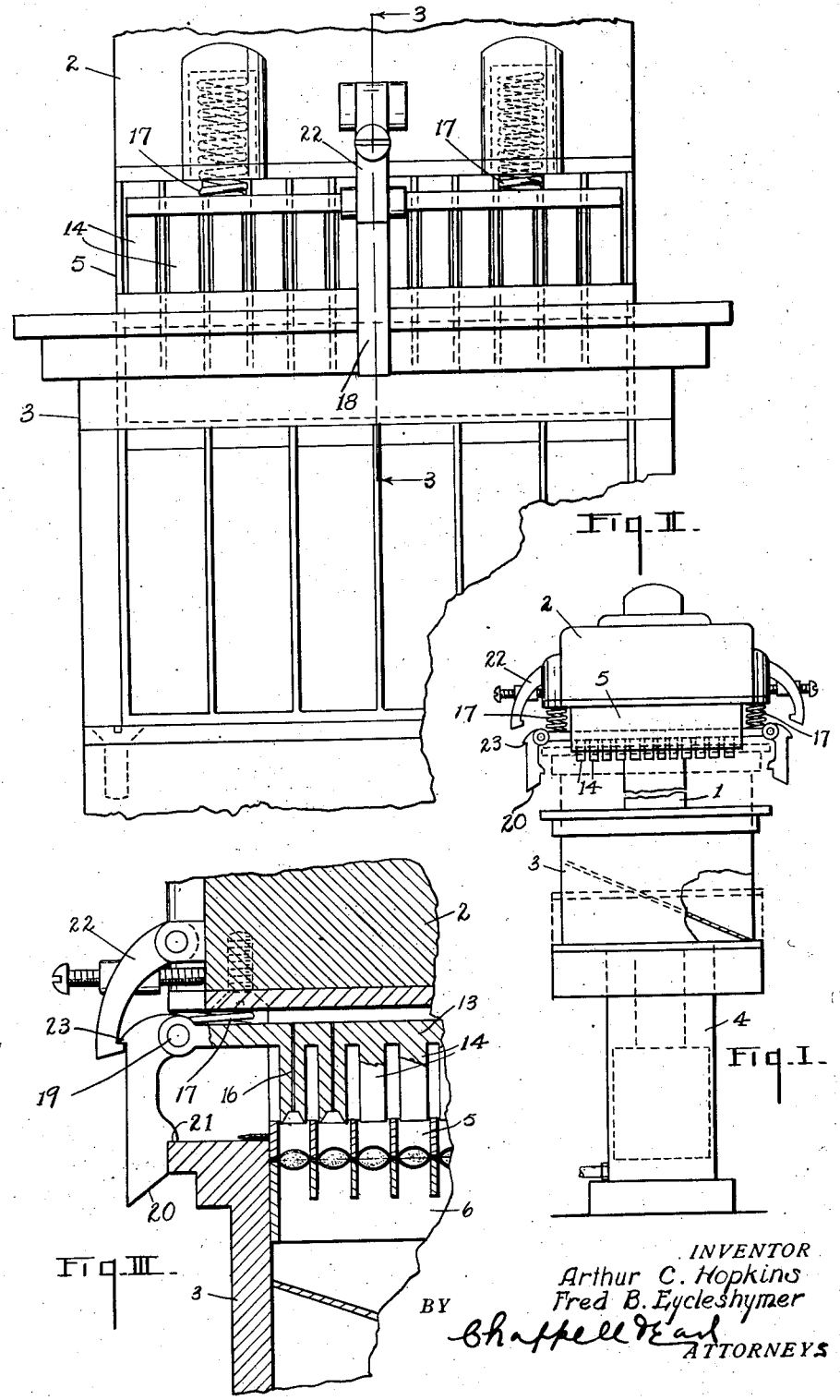

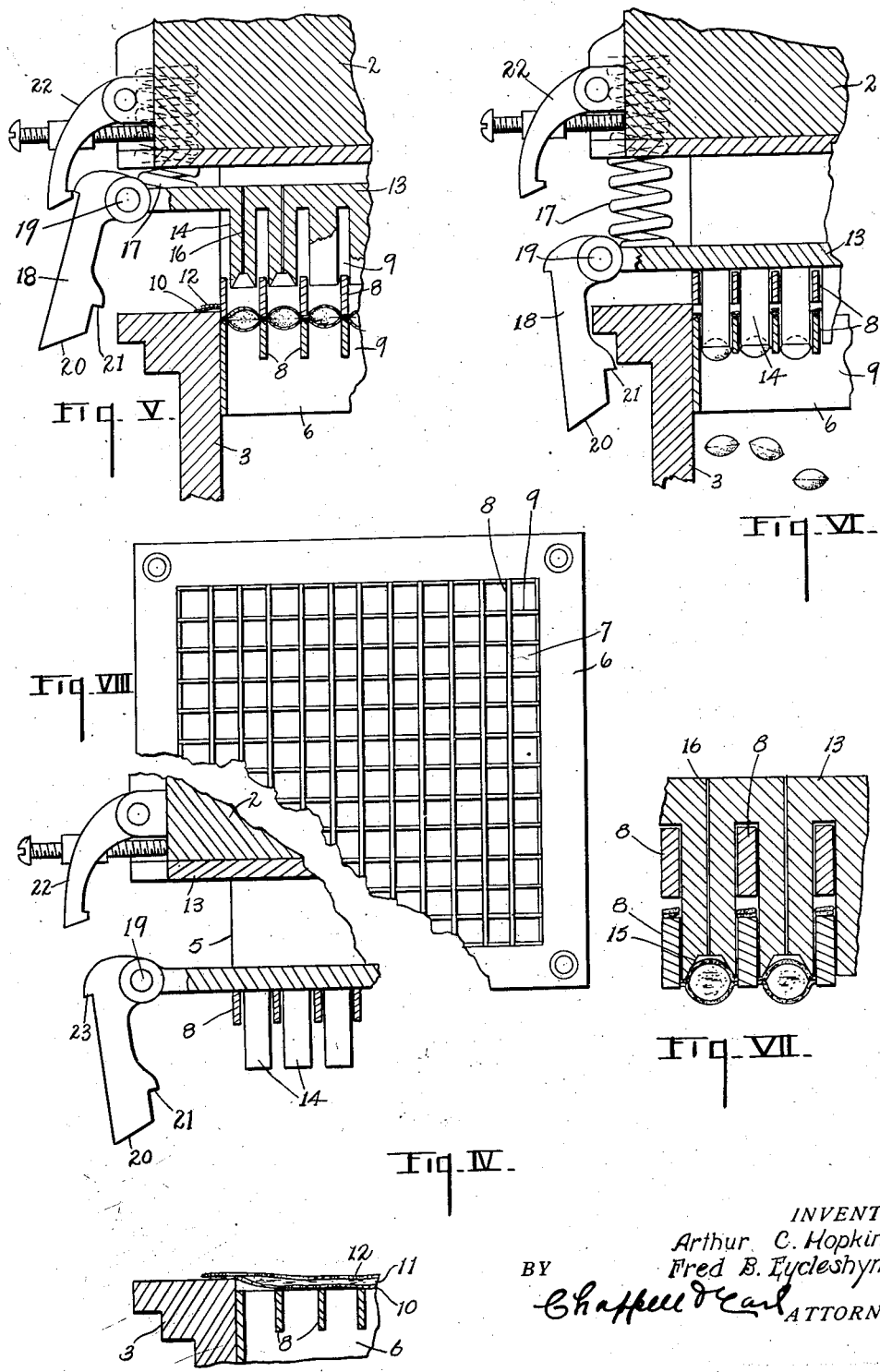

ARTHUR C. HOPKINS AND FRED B. EYCLESHYMER, OF NILES, MICHIGAN.

CAPSULE-MOLDING MACHINE.

Application filed October 6, 1924. Serial No. 742,033.

*To all whom it may concern:*

Be it known that we, ARTHUR C. HOPKINS and FRED B. EYCLESHYMER, citizens of the United States, residing at Niles, county of Berrien, State of Michigan, have invented certain new and useful Improvements in Capsule-Molding Machines, of which the following is a specification.

This invention relates to improvements in capsule molding machines.

The main objects of this invention are:

First, to provide an improved capsule molding machine which is of very large capacity.

Second, to provide an improved capsule molding machine in which the formed capsules are automatically ejected or discharged from the machine.

Third, to provide an improved capsule mold which results in a minimum of waste of the capsule material.

Objects pertaining to details and economies of construction and operation of our invention will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing forming a part of this application, in which:

Fig. I is a front elevation of a capsule molding machine embodying the features of our invention, parts being broken away for convenience in illustration.

Fig. II is a fragmentary side elevation of the machine closed and prior to the actuation of the stripper or ejector.

Fig. III is a fragmentary vertical section on a line corresponding to line 3—3 of Fig. II.

Fig. IV is a fragmentary sectional view corresponding to that of Fig. III with the mold fully open.

Fig. V is a fragmentary section corresponding to that of Fig. III showing the position of the parts with the stripper released.

Fig. VI is a fragmentary section corresponding to that of Fig. V showing the stripper in actuated position.

Fig. VII is a detail vertical section showing details of the stripper.

Fig. VIII is a fragmentary plan view of the bottom mold.

In the drawing the sectional views are taken looking in the direction of the little arrows at the ends of the section lines and similar numerals of reference refer to similar parts throughout the several views.

Referring to the drawing, the embodiment of our invention illustrated comprises a pedestal-like frame 1 having an overhanging head 2 mounted thereon. The plunger 3 reciprocates vertically and below this head, the plunger being actuated by a hydraulic means indicated generally by the numeral 4. As the structural details of the hydraulic means form no part of this invention they are not illustrated.

The top mold designated generally by the numeral 5 is mounted upon the head 2 while the bottom mold designated generally by the numeral 6 is mounted upon the plunger 3. The bottom mold 6 is shown in plan in Fig. VIII. The top mold is of the same construction.

These molds have a plurality of rectangular cells 7 open at the top and bottom. These cells are formed by intersecting partition walls 8 and 9, the walls of the two mold members being in alinement as shown in the sectional views in Figs. III, V, VI and VII. The bottom mold member 6 is set into the plunger 3 with the upper edges of its cells somewhat below the upper edge of the plunger, thereby permitting the bottom sheet 10 of capsule forming material being arranged thereon as shown in Fig. IV with its edges resting upon the edges of the plunger, thereby dishing the sheet to receive the filling material 11. The top sheet 12 of capsule forming material is arranged over the filling material as shown in Fig. IV. These sheets 10 and 12 are of gelatin material adapted when pressed together to unite, thus sealing the capsules.

With the sheets and filler arranged as shown in Fig. IV the mold is closed as shown in Fig. II, the opposed walls of the cells forcing the filler from between the walls and pressing the casing together, thereby sealing the same. By forming the cells of the thin flat partitions as shown in the drawing there is a minimum of waste of casing material and the sealing pressure is uniform.

The sealed capsules are ejected by a stripper comprising a plate 13 having a plurality of stripper fingers 14 alined with the mold cells, these fingers having cupped tips 15 conformed so that the edges of the cups engage the capsules at their sealed edges and the sides of the cups engage the top sides of the capsules adjacent their edges so that there is no danger of rupturing the capsules, and they are stripped or ejected by pushing downwardly through the bottom mold cells as illustrated in Fig. VI. The fingers have longitudinal air passages 16 therein for the escape of air as the cupped tips of the fingers engage the capsules.

The stripper is actuated by means of the springs 17 mounted on the head 2 to engage the stripper plate 13. On the up stroke of the plunger 3 it engages the supports 18 which are pivoted at 19 on the stripper plate and have beveled edges 20 and shoulders 21. The supports are balanced so that they normally swing into the position shown in Fig. VI, the plunger engaging the beveled ends 20 to swing them out slightly and effectively engaging the shoulders 21.

As the plunger moves upwardly the springs are compressed as shown in Fig. III and the pivoted dogs 22 engage the keepers 23 on the supports as shown in Fig. III. As soon as the plunger 3 starts on its return movement the dogs 22 release the supports 18 thereby freeing the stripper for actuation by the springs 17. The stripper plate 13 is arranged above the cells of the top mold and is supported thereby when in fully actuated position, see Fig. VI.

Our improved capsule mold is of large capacity, the product is uniform, the capsules being effectively sealed, and there is a minimum of waste of the casing material.

We have illustrated and described our improvements in an embodiment which we have found very desirable. We have not attempted to illustrate or describe certain modifications or adaptations as we believe the disclosure made will enable those skilled in the art to embody or adapt the same as may be desired.

Having thus described our invention what we claim as new and desire to secure by Letters Patent is:

1. In a capsule mold, the combination of a reciprocating plunger, an overhanging frame, a bottom mold member mounted on said plunger, a coacting top mold member mounted on said frame, said mold members having opposed rectangular open cells arranged with the walls thereof in alinement, a stripper mounted on said frame and provided with stripper fingers alined with said cells and having cupped tips conformed so that the edges and sides of the capsules adjacent their edges are engaged thereby, said fingers having longitudinal air passages therein, actuating springs for said stripper, supports pivotally mounted on said stripper to be engaged by said plunger on the up stroke thereof whereby said springs are placed under compression, and tripping dogs mounted on said head to engage said supports whereby the stripper is released on the initial return movement of the plunger.

2. In a capsule mold, the combination of a reciprocating plunger, an overhanging frame, a bottom mold member mounted on said plunger, a coacting top mold member mounted on said frame, said mold members having opposed rectangular open cells arranged with the walls thereof in alinement, a stripper mounted on said frame and provided with stripper fingers alined with said cells, actuating springs for said stripper, supports pivotally mounted on said stripper to be engaged by said plunger on the up stroke thereof whereby said springs are placed under compression, and tripping dogs mounted on said head to engage said supports whereby the stripper is released on the initial return movement of the plunger.

3. In a capsule mold, the combination of a reciprocating plunger, an overhanging frame, a bottom mold member mounted on said plunger, a coacting top mold member mounted on said frame, said mold members having opposed rectangular open cells arranged with the walls thereof in alinement, a stripper mounted on said frame and provided with stripper fingers alined with said cells and having cupped tips conformed so that the edges and sides of the capsules adjacent their edges are engaged thereby, said fingers having longitudinal air passages therein, and means for actuating said stripper.

4. In a capsule mold, the combination of a reciprocating plunger, an overhanging frame, a bottom mold member mounted on said plunger, a coacting top mold member mounted on said frame, said mold members having opposed rectangular open cells arranged with the walls thereof in alinement, a stripper mounted on said frame and provided with stripper fingers alined with said cells, and means for actuating said stripper.

5. A capsule mold comprising coacting mold members having open cells, a reciprocating means for opening and closing said mold, a stripper provided with a plurality of fingers alined with said cells, a spring means for actuating said stripper, and means for holding said stripper in retracted position released on the initial return movement of the plunger.

6. A capsule mold comprising coacting mold members having open cells, a reciprocating means for opening and closing said mold, and a stripper provided with a plurality of fingers alined with said cells.

7. A capsule mold comprising coacting mold members having rectangular open cells, the walls of the cells being in alinement, a reciprocating means for opening and closing said mold, and a stripper provided with a plurality of fingers alined with said cells.

8. A capsule mold comprising coacting mold members having open cells, the walls of the cells being in alinement, means for opening and closing said mold, and an ejector provided with a plurality of fingers alined with said cells.

9. A capsule mold comprising coacting mold members having alined rectangular open cells formed by thin flat walls of uniform thickness.

10. A capsule mold comprising coacting mold members having opposed open cells formed by walls of uniform thickness, corresponding walls of opposed coacting cells being disposed in the same plane.

In witness whereof we have hereunto set our hands.

ARTHUR C. HOPKINS.
FRED B. EYCLESHYMER.